Patented Jan. 24, 1939

2,144,740

UNITED STATES PATENT OFFICE 2,144,740

PROCESS FOR PRODUCING LUMPY, WATER-RESISTANT BODIES CONSISTING SUBSTANTIALLY OF MAGNESIUM OXIDE AND CALCIUM COMPOUNDS

Arthur Pollak, Kaznejov, Czechoslovakia

No Drawing. Application March 17, 1936, Serial No. 69,338. In Czechoslovakia October 18, 1935

3 Claims. (Cl. 23—201)

For de-acidifying, alkalizing or neutralizing waters, in particular drinking water, service water or boiler-feeding water, use is successfully made of lumpy bodies which, as active constituent, contain magnesium oxide, in some cases in addition to calcium compounds and chiefly in addition to calcium carbonate. These substances are generally produced by heating magnesite or dolomite. In this method of production, however, it is extremely difficult to obtain uniform bodies which are all of uniform hardness and are uniformly resistant to water. For this reason, a portion of the bodies becomes prematurely dissociated in the practical use of substances produced in this way in the filtering vessels, whereby the apparatus is obstructed and the water is prevented from flowing through. The operation of such an apparatus is then irregular and extremely difficult.

The subject of this invention is a process whereby it is possible to produce uniform lumpy bodies which are sufficiently hard and which retain their form and hardness in contact with water, a mixture of magnesium oxide or magnesium hydroxide with calcium oxide or calcium hydroxide being taken as the initial raw material. This mixture may be obtained by mixing burnt lime or slaked lime with burnt or hydrated magnesia, which substances are obtained by separate burning of the natural carbonate minerals, that is, from limestone and magnesite and, if necessary, subsequent slaking. However, it is also possible to produce this oxide mixture by burning the natural mineral mixtures for example from dolomite. To this mixture of the oxides or hydroxides of the calcium and magnesium, water is added and, by kneading, a paste is produced from which bodies of any desired form and size are produced with the aid of ordinary processes commonly used in ceramics, for example by pressing. To increase the plasticity of such a paste, it is suitable to add substances which increase only the plasticity, such as soda, or substances which increase the porosity of the finished product. Substances which increase the porosity are those which generate gas or foam, such as metallic magnesium, or mechanically acting filling or plasticity decreasing agents, which do not contract in the further producing process. The bodies produced in the form of granules, cylinders or small tubes of various sizes are then dried. It is also possible to obtain the granular bodies consisting of a mixture of the oxides and hydroxides, by so carefully slaking granular burnt dolomite, dolomitic limestone or calcareous magnesite, after suitable crushing to the granular state, that upon slaking the granular material does not fall away to powder. After the drying of the small bodies, they are acted upon by gases which so react with the calcium oxide or calcium hydroxide contained in them that compounds insoluble and difficultly soluble in water are formed, and which the magnesium oxide converts into strong uniform bodies, the strength of which is retained even in constant contact with water. Such gases are, principally, carbon dioxide, or technical gases containing these oxides. The action of such gases on the lumpy mixture of the oxides is continued until the desired saturation of the lime is achieved, which takes place before the saturation of the magnesium oxide owing to the higher solubility and reactivity of the lime. The strengthened bodies obtained may then, if necessary, be dehydrated in the reaction vessel by the action of heat.

*Working example*

To 80 kilogrammes of finely ground magnesium hydroxide, 20 kilogrammes of slaked lime are added and the mixture is thoroughly mixed. about 20–50 kilogrammes water are then added and the mixture is so kneaded that a thick plastic paste is formed. From this paste, cylindrical vermicelli or thin tubes are formed in a worm press having a perforated outlet, which vermicelli are cut up into thin cylinders, which are then dried in the drying chambers. The granules produced are soft and become dissociated in contact with water. A reaction tower is filled with the small dry bodies, diluted carbon dioxide in the form of flue gases being driven into the said tower and samples being continually taken from the tower, which are examined in order to ascertain the quantity of bound carbon dioxide and the strength thereof. When the contents of the tower have absorbed approximately 25 kilogrammes carbon dioxide, the current of carbon dioxide is stopped and the contents of the reaction tower are dried. In this way, cylindrical bodies are produced which contain approximately 47% MgO magnesium oxide in hydrate form, and 30% $CaCO_3$ calcium carbonate and 7% $MgCO_3$ magnesium carbonate, the rest being water of hydration and impurities. These small bodies are extremely hard and their hardness is retained even upon shaking with or the passing over of water.

The example given may be modified in any desired manner with respect to the proportion of the calcium oxide or calcium hydroxide and magnesium oxide or magnesium hydroxide, both with regard to the additions for increasing the plasticity and the nature of the formation of the granules of the initial mixture, and the like.

The small bodies produced are used in practice chiefly as alkalizing agents for treating water, but may also be used for treating gases.

What I claim and desire to secure by Letters Patent of the United States is:—

1. A process for producing firm chemically active bodies in the form of lumps and pieces which are physically resistant and stable in water and substantially consist of a large proportion of magnesium oxide and a limited amount of a calcium compound serving physically as a framework and reinforcement for said oxide, which process in combination consists in forming a paste of a form of magnesium oxide and a calcium compound of the class consisting of calcium oxide and hydroxide with water, then shaping the paste into lumps and pieces of desired size and form, subsequently drying the lumps and pieces thus formed, and finally exposing these lumps and pieces to gaseous carbon dioxide at approximately ordinary temperature until the entire amount of the calcium compound has been converted into a concrete form of calcium carbonate which is at most slightly soluble in water and a portion of the magnesium compound has also been converted into magnesium carbonate and the remainder of the magnesium is present in a form of magnesium oxide which forms a large proportion of the mass.

2. The process according to claim 1, which in addition includes the step of introducing a soluble substance in comminuted form into the raw materials for making the paste in order to increase the plasticity of said paste while working the same.

3. The process according to claim 1, which in addition includes the step of introducing a plasticity decreasing substance in comminuted form into the raw materials for making the paste in order to decrease the plasticity thereof and increase the ultimate porosity of the finished product and also increase the active exposed surface throughout the mass of the same.

ARTHUR POLLAK.